Patented Nov. 24, 1931

1,833,683

UNITED STATES PATENT OFFICE

RALPH F. MEYER, OF FREEPORT, PENNSYLVANIA, ASSIGNOR TO MEYER MINERAL SEPARATION COMPANY, OF PITTSBURGH, PENNSYLVANIA, A CORPORATION OF DELAWARE

METALLURGICAL PROCESS

No Drawing.  Application filed April 25, 1930.  Serial No. 447,411.

This invention relates to metallurgical processes, and especially to the recovery of metals from ores and other metalliferous materials.

In the roasting of ores some or all of the metal values are converted to salts, such as sulfates, and as these processes have been carried out heretofore the salts build up on the particles of ore. This salt coating retards the roasting reactions, and in many cases the ore particles become coated so completely with these salts as to be practically impenetrable to oxygen or oxides of sulfur. As a result complete oxidation of the sulfide particle has been, in general, not possible, and therefore extraction yields have been inefficient in many cases. In order to overcome this disadvantage it has been proposed to elevate the roasting temperature. This is not wholly desirable, partly for the reason that many ores tend to form highly refractory compounds at these higher temperatures. Also, excess heat usually converts the salts to insoluble forms. These difficulties are especially prominent in the case of dense ores, such as those of lead and manganese, or the complex lead-copper ores, and zinc ores.

It is among the objects of this invention to provide a process for the oxidation of sulfide ores and other metal-bearing materials, which is simple, easily performed, does not materially increase the expense as compared with existing processes, in which the shell of salts which tends to surround the ore particles and impede gas contact is broken down or rendered readily penetrable by the reacting gases, which materially facilitates and accelerates the roasting reactions and increases extraction yields as compared with prior practice, and which is particularly applicable to dense and highly refractory ores.

The invention is predicated upon my discovery that by partially roasting an ore, breaking down the structure of the film of oxidized material which has been formed about the particles, and then subjecting the ore to a heat treatment, the reactions are both accelerated and carried more nearly to completion than has heretofore been possible, so that the ore is readily amenable to extraction of its metal values, and extraction yields are increased to a considerable extent.

The invention is applicable to substantially any ore, tailing, or other metalliferous or metal-bearing material. It is particularly applicable to sulfide ores, but materials, such as tailings, which contain little or no sulfide sulfur may be treated by admixing them with sulfur or a sulfide, and particularly iron sulfide, or pyrites, prior to roasting.

In the practice of the invention, the ore is first subjected to a roasting step, in accordance with the usual practice, in any suitable form of furnace. My experiments have shown that where much iron is present, it is desirable to conduct the first roasting step at a temperature not exceeding the decomposition temperature of iron sulfate. In the case of ores containing or admixed with iron, this roasting is preferably carried out at a temperature below about 525° C., and most suitably below about 475° C., because at this lower temperature a greater amount of iron sulfate is formed and retained in the ore, which is of assistance in subsequent reactions.

In the case of other types of ores different temperatures may be used. For example, with high zinc ores having a dense structure, the iron content is usually low and is not a material factor in roasting, the zinc sulfate here being the retarding agent. Such zinc ores may be initially roasted at about 500° to 575° C., and by hydrating in accordance with the invention, oxidation is again allowed to proceed at a relatively low temperature.

The ores may be and preferably are, roasted while in a finely divided condition, for the reason that the reactions are materially accelerated, and the subsequent treatments are rendered more efficacious. The degree of fineness of the ore will depend somewhat upon its character, but in general the ores should be ground to 100-mesh, and in the case of particularly dense ores, such as those of zinc or manganese, or highly refractory ores, such as those containing titanium, it is preferable to grind the ores to 200-mesh, or finer, reference here being made to the screen sizes adapted by the U. S. Bureau of Standards.

In the first roasting step a portion of the sulfide sulfur is oxidized. After this step is completed, the ore is treated to break down the film of salts or oxidized material formed in roasting, to render the particles amenable to heat treatment. This may be accomplished by finely grinding the roasted material, whereby the film of salts on the particles is disrupted, exposing fresh surfaces. In the preferred embodiment, however, the ore is treated with a liquid to hydrate or partially dissolve the water soluble salts, such as sulfates, which have been formed. For this purpose water or any other suitable liquid, such as a reagent solution of sulfur dioxide or of chlorine, may be used. This hydration causes the salts which have been formed in roasting to become loosened and expose new surfaces of the sulfide particle for further oxidation. This action is further enhanced in the following heat treatment step, in which the salts tend to swell and become porous, thus further increasing ease of access of the reagent gases to the ore particles.

In hydrating the partly roasted ore it is desirable to use as small an amount of liquid as is consistent with proper hydration, for the reason that subsequent heat treatment of the ore is shortened and less liquid has to be evaporated, and because when thus hydrated the salts adhere loosely to the ore particles, while being rendered penetrable by the reagent gases.

To this end the amount of water or other liquid used is preferably such as to render the roasted material only quasi-wet, by which is meant that sufficient liquid is used to thoroughly hydrate the salts, but that there is insufficient liquid to occupy any material portion of the interstices between the particles, or to percolate through the ore mass. In this condition the ore particles do not agglomerate to any great extent, and the gases have free access to all particles.

The hydrating may be also accomplished in other ways, for example by a liquid-supplying atmosphere adapted to condense in and through the ore to hydrate the salts. For this purpose an atmosphere of water vapor, or low pressure-low temperature steam may be used.

In the case of ores which are finely ground and which tend to agglomerate in the initial roasting, it may in some instances be desirable to both regrind and hydrate the roasted ore. In general, however, this will not be necessary.

After hydration, the ore is subjected to a heat treatment step in which the hydrated ore is dried and roasted to remove a further portion, preferably the balance, of the sulfide sulfur. The heat treatment may be effected in various ways, but in the preferred embodiment the drying is accomplished as a separate step, for example by subjecting the ore to the heat radiated through the top of a furnace.

After having been dried, the ore is again roasted, and this roasting step may be carried out at any desired temperature, and most suitably at a temperature to cause decomposition of the iron sulfate. In this step further oxidation of sulfide sulfur is effected, and this proceeds rapidly because the hydration and drying have put the unconverted portions of the ore in condition for easy reaction. Generally, the balance of the sulfur will be oxidized in this step.

The following examples are indicative of the benefits to be derived from the practice of the invention:

*Example 1.*—A complex refractory ore containing about 6.25% of lead, 3.99% of copper, and 3% of manganese, was roasted on a six-hearth wedge-type furnace for 3¼ hours at about 475° C. This ore contained sufficient sulfur to provide the necessary heat on the various hearths, and no other fuel was necessary. The ore was then cooled and thoroughly mixed with 7% by weight of water, after which it was dried on top of the furnace. The dried ore was then roasted for three hours at a temperature below about 550° C. After cooling, the ore was leached with water, which removed 85% of the copper and 80% of the manganese. The residue was then leached with 5% NaOH solution which extracted substantially all of the lead.

Another portion of this same ore was treated in the same manner, except that it was not subjected to the hydrating step. As thus treated, only 60% of the copper and 20% of the manganese were soluble in water, while 5% NaOH solution removed but 70% of the lead.

*Example 2.*—In this test a complex and refractory ore containing 2.5% of copper, 6% of manganese, and 3.75% of lead was roasted completely according to the best present practice. As thus roasted, 50% of the copper and 15% of the manganese could be extracted with water, and 65% of the lead with 5% NaOH solution.

A sample of this ore roasted under the conditions described in Example 1 was mixed with 7% by weight of water, and again roasted. This treatment rendered 75% of the copper and 60% of the manganese soluble in water, and 80% of the lead was soluble in sodium hydroxide solution. Another sample was given a second roasting step, without being hydrated, and after roasting it was found that the extractions were practically the same as with a single roast, without hydration.

These examples show the great benefit to be derived from the process provided by this invention, in which the ore is hydrated after being roasted, and then subjected to a second roasting step. They also show that continued roasting without hydration is of practically no benefit.

The procedure just described may be modified in various ways to obtain the benefits of the invention. For example, after being hydrated the ore may be treated with a reagent for the purpose of effecting an oxidation, or to produce chloridizing reactions, and the like. While in the hydrated condition, the ore is especially susceptible to gas treatments, for example oxidation. In the preferred embodiment of the invention the hydrated ore is thus subjected to a reagent treatment, for the purpose of converting the ferrous sulfate which exists in a partly roasted ore to ferric sulfate, which is a much more powerful sulfatizing reagent than ferrous sulfate. This may be effected by means of air, ozone, chlorine and the like. Likewise, after being hydrated, and preferably after drying and before the second roasting, the ore may be mixed with other reagents, such as chlorides, for chloridizing the ore. Likewise, reagent solutions may be used as the hydrating liquid for the same purpose. Furthermore, the hydration and heat treatment steps may be repeated should it be desirable to so so, but in most cases this will be unnecessary.

The following example is illustrative of such modified procedures.

*Example 3.*—A sample of ore from the first stage roast of Example 1 was thoroughly mixed with 10% by weight of water, the quasi-wet ore was then saturated with chlorine to convert the iron from the ferrous to the ferric condition. After this treatment, the ore was dried, mixed with 12% by weight of common salt, and it was then roasted for two hours at 525° C. in a muffle, using a limited amount of air. Extraction with water removed more than 98% of the total copper and manganese, and substantially all of the lead was removed with 5% NaOH solution.

A similar sample was also chloridized in the same manner, except that the ore was not hydrated. As thus treated, less than 90% of the copper, 50% of the manganese and only 80% of the lead could be leached out in the manner just described. This treatment of a non-hydrated ore required more air, the fuel requirement was higher, and the extraction yields were substantially less.

The invention is applicable to substantially all ores and other metalliferous materials, such as tailings, and the like, and in the appended claims the word "ore" is used to refer to all such materials.

In the preceding description of the invention reference has been made to heating below the decomposition temperature of iron sulfate, for the reason that iron is present in almost all metalliferous materials, and because it is a powerful sulfatizing and chloridizing reagent, and is of material assistance in rendering the metal values readily recoverable. For this reason, it may be termed a reagent metal. The same result is possible with other metals which may form salts in two stages of oxidation, such as copper, and all such metals are, in this sense, reagent metals. Iron is most desirable for this purpose, and it may be admixed with the material to be treated where it is not naturally present, for example in the form of oxide or sulfide. But where iron is not used, the roasting steps should generally be conducted at temperatures not materially in excess of the decomposition temperature of the reagent metal sulfate.

According to the provisions of the patent statutes, I have explained the principle and mode of operation of my invention, and have described what I now consider to represent its best embodiments. However, I desire to have it understood that, within the scope of the appended claims, the invention may be practiced otherwise than as specifically described.

I claim:

1. A process of recovering metals from ores containing or admixed with sulfur comprising roasting the ore at a temperature below about 525° C. to oxidize a portion of the sulfur, cooling to normal temperature, treating the cooled ore with steam to hydrate it, then drying the hydrated ore while retaining the hydrates therein and then roasting it to oxidize a further portion of sulfur, and subsequently extracting metal values from the thus-treated ore.

2. A process of recovering metal from ore of sulfide type, comprising roasting said ore at low temperature with air to provide metal sulfate therein, cooling to normal temperature and applying water in amounts restricted to bring the ore to loose, moist condition and to provide hydrate of said sulfate therein, drying gradually to preserve said hydrate, and then elevating the temperature to complete roasting of the dried ore.

3. A process of recovering metal from ore of sulfide type containing reagent metal compound, comprising roasting said ore at low temperature with air to provide reagent metal sulfate therein, cooling to normal temperature, mixing the ore with water to render it quasi-wet and hydrate said reagent metal compound, drying gradually to remove any free moisture while preserving said hydrate, and then elevating the temperature to decompose said hydrate and complete roasting of said ore.

4. A process of recovering metal from ore of sulfide type containing a bivalent reagent metal, comprising roasting said ore at low temperature with air to form sulfate of said metal, cooling to normal temperature and introducing water in amounts restricted to bring the ore to loose, moist condition and to hydrate said sulfate, oxidizing said sulfate to its higher valence while preserving hydrate, then gradually removing free moisture, and subsequently completing roasting of said ore.

5. A process of recovering metal from ore of sulfide type containing iron, comprising roasting said ore at low temperature with air to provide ferrous sulfate therein, cooling to normal temperature, mixing with water to bring said ore to quasi-wet condition and hydrate the ferrous sulfate, then removing free moisture from the ore while maintaining said hydrate therein, and then roasting said mixture while decomposing said hydrated compound.

6. A process of recovering metal from ore of sulfide type containing iron, comprising roasting said ore at low temperature with air to provide ferrous sulfate therein, cooling to normal temperature and reducing to minus 100-200 standard mesh, introducing water to bring said ore to quasi-wet condition and to provide hydrated ferrous compound therein, then elevating the temperature of said ore gradually while maintaining hydrate therein, and then completing the roasting of said mixture while decomposing said hydrate.

In testimony whereof, I sign my name.

RALPH F. MEYER.